(12) United States Patent
Meyer et al.

(10) Patent No.: US 6,366,416 B1
(45) Date of Patent: Apr. 2, 2002

(54) GLIDE TEST HEAD WITH ACTIVE FLY HEIGHT CONTROL

(75) Inventors: Dallas W. Meyer, Burnsville; Mark J. Schaenzer, Eagan, both of MN (US); Zhu Feng, Fremont, CA (US); Chung Yuang Shih, Cupertino, CA (US); Chiu-Shing Frank Poon, Pleasanton, CA (US); Vidyadhara K. Gubbi, Milpitas, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/497,370

(22) Filed: Feb. 3, 2000

(Under 37 CFR 1.47)

(51) Int. Cl.[7] .................................................. G11B 5/02
(52) U.S. Cl. ........................ 360/25; 360/78.04; 324/212
(58) Field of Search ................................ 360/25, 73.02, 360/73.03, 78.04, 97.01, 97.02; 324/212

(56) References Cited

U.S. PATENT DOCUMENTS

| | | | |
|---|---|---|---|
| 5,673,156 A | * | 9/1997 | Chen et al. .............. 360/97.01 |
| 6,031,685 A | * | 2/2000 | French et al. ............ 360/97.01 |
| 6,105,421 A | * | 8/2000 | Yao et al. ..................... 73/105 |
| 6,140,814 A | * | 10/2000 | Sundaram ................... 324/212 |

* cited by examiner

Primary Examiner—Regina Y. Neal

(57) ABSTRACT

An apparatus and method for evaluating surface characteristics of a recording disc prior to incorporation into a disc drive. A glide test system includes a glide test head supportable over the disc, the glide test head having a negative-pressure air bearing slider and a contact sensor which outputs a signal when the glide test head contacts a feature of the disc surface. The glide test head and the disc are characterized as opposing plates of a variable capacitor with a dielectric layer therebetween including at least a layer of air supporting the glide test head. A voltage source, operably coupled to the glide test head and the disc, applies a fly height control voltage across the capacitor to adjust the fly height of the glide test head. The disc surface preferably comprises a data region configured to magnetically store data as the disc is rotated and a texturized landing zone configured to support the disc drive read/write head when the disc is stopped. The voltage source accordingly applies a first fly height control voltage to maintain the glide test head at a first glide distance over the data region and a second fly height control voltage to maintain the glide test head at a second, greater glide distance over the landing zone.

12 Claims, 6 Drawing Sheets

GLIDE TEST HEAD WITH ACTIVE FLY HEIGHT CONTROL

FIELD OF THE INVENTION

This invention relates generally to the field of rigid disc drives, and more particularly, but not by way of limitation, to a glide test head assembly for use in evaluating surface characteristics of a magnetic recording disc.

BACKGROUND

Data storage devices of the type known as "Winchester" or "hard" disc drives are well known in the industry. Such disc drives record digital data on a plurality of circular, concentric data tracks on the surfaces of one or more rigid discs. The discs are typically mounted for rotation on the hub of a brushless direct current (dc) spindle motor. In disc drives of the current generation, spindle motors rotate the discs at speeds of up to 10,000 revolutions per minute (rpm).

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted.

When current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼"" format. Disc drives of the current generation typically have a data capacity several gigabytes in a 3½" package which is only one fourth the size of the full height, 5¼" format or less. Even smaller standard physical disc drive package formats, such as 2½" and 1.8", have been established. In order for these smaller envelope standards to gain market acceptance, ever greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction was needed to reduce the size of the individual bit domain and allow greater recording density.

Since the reduction in gap size also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a non-magnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, as the size of contemporary head gaps allowed data recording and retrieval with a head flying height of about 3,000 Angstroms (Å), corresponding to about $300\times10^{-9}$ meters (300 nm) or about $12\times10^{-6}$ inches (12 $\mu$in), the surface characteristics of the discs were adequate for the times.

Disc drives of the current generation incorporate heads that fly at nominal heights of around 380 A (about 38 nm or 1.5 $\mu$in), with efforts underway to reduce this flying height to below 250 A (25 nm or 1.0 $\mu$in). Clearly, the surface characteristics of the discs must be much more closely controlled to accommodate such reduced flying heights.

In current disc drive manufacturing environments, it is common to subject each disc to component level testing before it is assembled into a disc drive. One type of disc test is referred to as a "glide" test, which is used as a go/no-go test for surface defects or asperities, or excessive surface roughness. A glide test typically employs a precision spin stand and a specially configured glide test head including a piezo-electric sensing element, usually comprised of lead-zirconium-titanate ($PbZrTi_3$), also commonly known as a "pzt glide test head." The glide test is performed with the pzt glide test head flown at approximately half the flying height at which the operational read/write head will nominally fly in the finished disc drive product. If the glide test is completed without contact between the pzt glide test head and any surface defects, then the disc is passed on the assumption that there will be no contact between the operational heads and the discs during normal operation.

On the other hand, if contact occurs between the pzt glide test head and a defect on the disc surface, the disc is subjected to a burnishing process in an attempt to remove or reduce the size of the offending media surface defect. The disc is retested and, if the burnishing operation was successful, the disc is approved for incorporation into a disc drive. Any disc which fails to pass the glide test after burnishing is scrapped.

A variant of the glide test, often used by disc media manufacturers, is sometimes referred to as a "glide avalanche" or GA test. In GA testing, a pzt glide test head is first flown at a greater than normal flying height above the disc surface. This initial increased flying height is commonly achieved by rotating the disc under test at a greater than normal speed, thus increasing the linear velocity between the disc and the test head, and increasing the strength and thickness of the air bearing supporting the test head above the disc surface.

The rotational speed of the disc under test is then gradually reduced until contact between the test head and disc occurs, at which point the current flying height is recorded. Correlation of a series of such test sequences at varying radii on the disc can be used by the disc media manufacturer as an indication of overall disc surface characteristics.

It is also common practice in the industry to provide a textured "landing zone" on the disc surface, on which the read/write head of the disc drive will come to rest during "power-off" or "sleep" conditions. Since the glide avalanche test simulates the loss of power to rotate the disc, the glide avalanche test is also frequently used by design engineers developing textured landing zones to study the landing characteristics of head assemblies on various types of landing zone textures.

With new disc drive products being developed to operate with operational head flying heights of about 250 A (25 nm or 1.0 $\mu$in), disc drive manufacturers have the need to perform glide tests using pzt glide test heads which can operate in a stable manner at flying heights of about 125 A (13 nm or 0.5 $\mu$in), a requirement which is difficult to achieve using existing glide test head technology.

Glide test heads typically include positive-pressure air bearing structures, and it is difficult to produce a positive-pressure air bearing glide test head which is stable at a flying height of 125 A (13 nm or 0.5 $\mu$in), as fly height variance (three-sigma standard deviation) can be as high as 113 A (11 nm or 0.45 $\mu$in). The instability of current generations of glide test heads at such flying heights results in head/disc contacts that are caused by this flying instability instead of reflecting true glide test results, and leads to the possibility of erroneous over-rejection of discs that are, in actuality, suitable for use.

A need clearly exists, therefore, for an improved glide test head and test system capable of reliably glide testing recording discs at substantially reduced flying heights.

SUMMARY OF THE INVENTION

The present invention is directed to an apparatus and method for evaluating surface characteristics of a recording disc prior to incorporation into a disc drive.

In accordance with preferred embodiments, a glide test system is provided which includes a glide test head supportable over the disc. The glide test head has a negative-pressure air bearing slider and a contact sensor which outputs a signal when the glide test head contacts a feature of the disc surface.

The glide test head and the disc are characterized as opposing plates of a variable capacitor with a dielectric layer therebetween including at least a layer of air supporting the glide test head. A voltage source, operably coupled to the glide test head and the disc, applies a fly height control voltage across the capacitor to adjust the fly height of the glide test head.

The disc surface preferably comprises a data region configured to magnetically store data as the disc is rotated and a texturized landing zone configured to support the disc drive read/write head when the disc is stopped. The voltage source accordingly applies a first fly height control voltage to maintain the glide test head at a first glide distance over the data region and a second fly height control voltage to maintain the glide test head at a second, greater glide distance over the landing zone.

These and various other features as well as advantages which characterize the present invention as claimed below will be apparent from a reading of the following detailed description and a review of the associated drawings.

DETAILED DESCRIPTION

Figure 1:
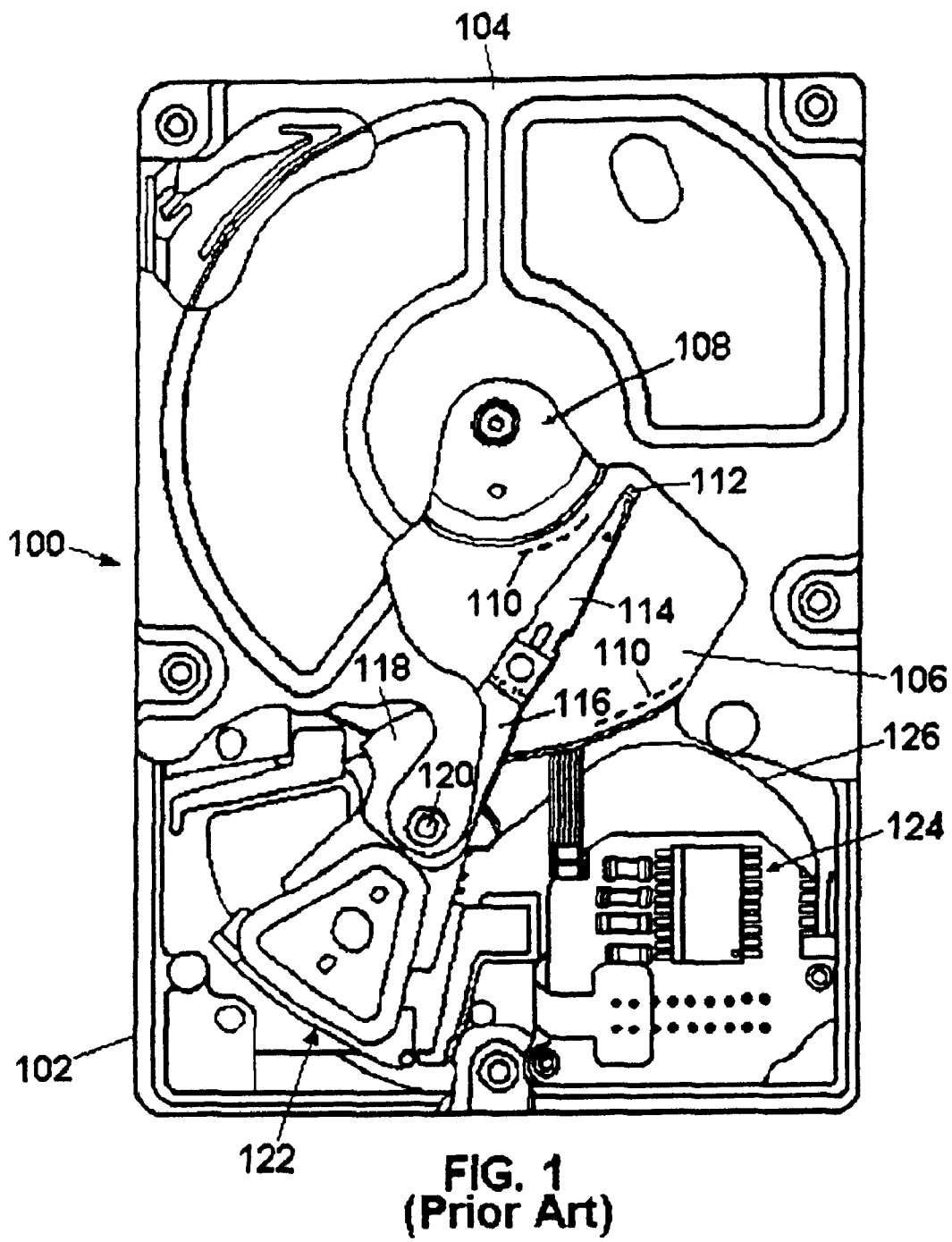
FIG. 1 is a plan view of a disc drive having a plurality of discs which can be advantageously tested in accordance with preferred embodiments of the present invention.

Referring now to the drawings, FIG. 1 shows a plan view of a prior art disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

As discussed in greater detail below, the disc drive includes a plurality of discs 106 which can be advantageously evaluated for surface defects prior to incorporation into the disc drive 100. The discs 106 are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112).

The head assemblies 112 are supported by head suspensions, or flexures 114, which are attached to actuator head mounting arms 116. The actuator head mounting arms 116 are integral to an actuator bearing housing 118 which is mounted via an array of precision ball bearing assemblies (not designated) for rotation about a pivot shaft 120. It will be understood that the head assemblies 112 preferably come to rest on texturized landing zones (not designated) at the inner radii of the discs 106 (beyond the data recording surface region bounded by dashed lines 110) when the disc drive is deactivated.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

It will be apparent to one of skill in the art that the proper operation of the disc drive 100 will depend in large part to the existence of a controlled, precise relationship between the head assemblies 112 and the discs 106. Therefore, it is common in the industry to test each of the discs 106 included in the disc drive 100 before the discs 106 are assembled into a disc drive 100.

Figure 2:
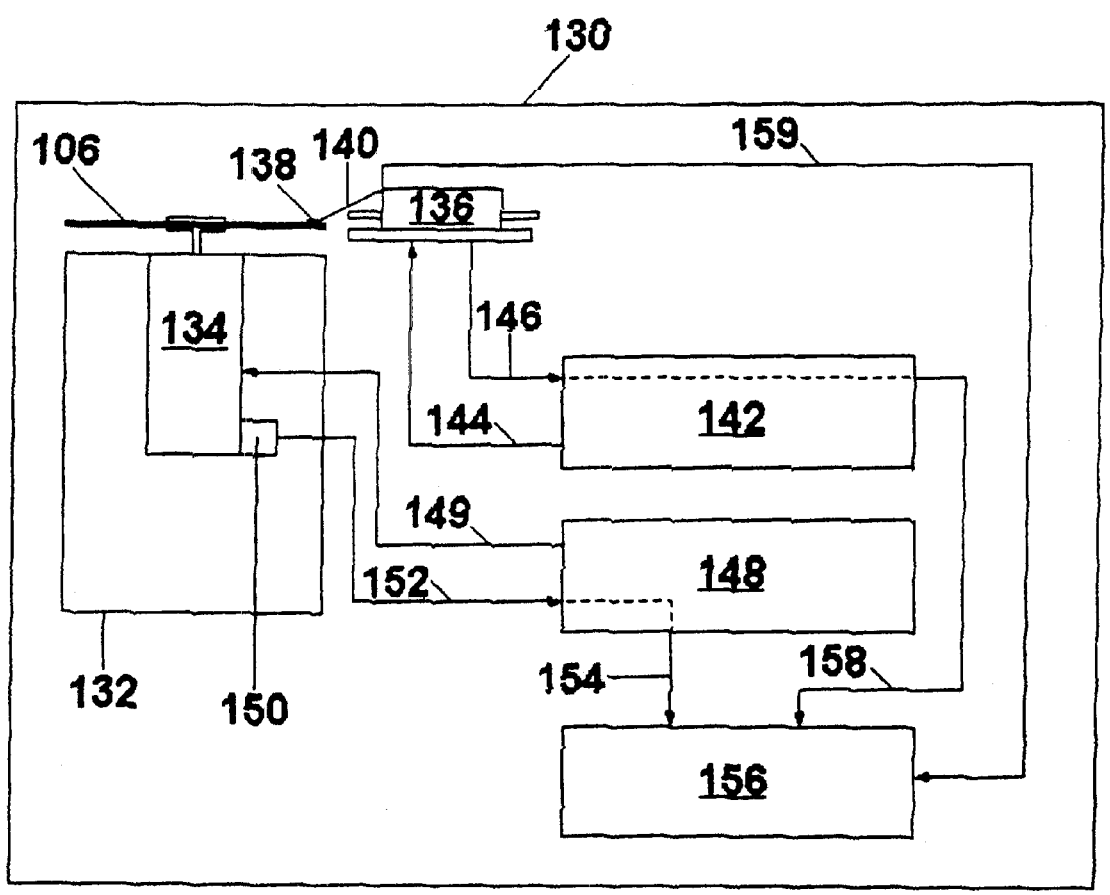
FIG. 2 is a simplified functional block diagram of a prior art glide test system.

FIG. 2 is a simplified functional block diagram of a typical prior art test system 130 used to test and map the surface of recording discs as components before the discs are assembled into disc drives. The test system 130 includes a precision spin stand 132 which further includes a spin motor 134 on which the disc 106 is mounted for rotation and testing.

The test system 130 also typically includes a linear actuator 136 which is used to controllably move a test head 138, mounted on a head suspension 140, on a linear path across a radius of the disc 106. Actuator control logic 142 is also included in the test system 130 and provides the control signals on signal path 144 needed to move the test head 138 and monitors, via signal path 146, the position of the test head 138 during testing of the disc 106. In a typical test system of the current art, the actuator supports and controls a second test head for simultaneous testing of the second disc surface. For purposes of clarity, FIG. 2 only a single test head 138.

The test system 130 also includes spin motor control logic 148 which is used to accelerate the spin motor 134 to its intended testing speed. It is common practice in the industry to vary the speed of the spin motor 134 as the test head 138 is moved across the disc radius to provide a constant linear velocity between the test head 138 and the area of the disc being tested. That is, as the test head 138 is moved inward, the speed of the spin motor is increased proportionally to maintain a constant linear velocity, and thus maintain a constant flying height for the test head 138.

The spin stand 132 also includes a spin motor position detection element 150 which provides a "once around" reference signal. This reference signal is carried over signal path 152 to the spin motor control logic 148 where it is used to assist in the control of the speed of the spin motor 134. The reference signal is also passed via signal path 154 to defect mapping logic 156, where it is utilized, along with the actuator position signal passed via signal path 158 by the actuator control logic 142, to maintain a constant calculation of the radial and circumferential portion of the disc 106 that is located under the test head 138.

During the testing operation, a disc 106 is mounted on the spin motor 134 and the spin motor 134 is brought up to operational speed by the spin motor control logic 148. Once the spin motor 134 is at the proper speed, the actuator control logic 142 causes the actuator 136 to move the test head 138 into cooperative arrangement with the surface of the disc 106. The test head 138 is then stepped across the spinning disc 106 at a rate selected to cause the test head 138 to pass over every portion of the disc surface. As the head is stepped across the disc surface, the spin motor control logic 148 varies the spin motor speed to maintain a constant relative linear velocity between the test head 138 and the disc area being tested as noted above.

A defect on the disc surface will cause the test head 138 to generate a defect signal which is passed to the defect mapping logic 156 via signal path 159. Recognition of the defect signal by the defect mapping logic 156 results in the current radial and circumferential location of the test head 138 relative to the disc 106 being recorded. Once the test head 138 has passed over the entire usable radial extent of the disc 106, all detected and recorded defects are correlated to produce a defect map of the entire disc surface.

Test systems of the type described above and which can be modified to include and implement the present invention are available from several sources. For example, a representative test system of this type is the model number MSA 450, manufactured by Cambrian Systems, Inc., a subsidiary of Phase Metrics Corporation, located in Westlake Village, Calif.

Figure 3:
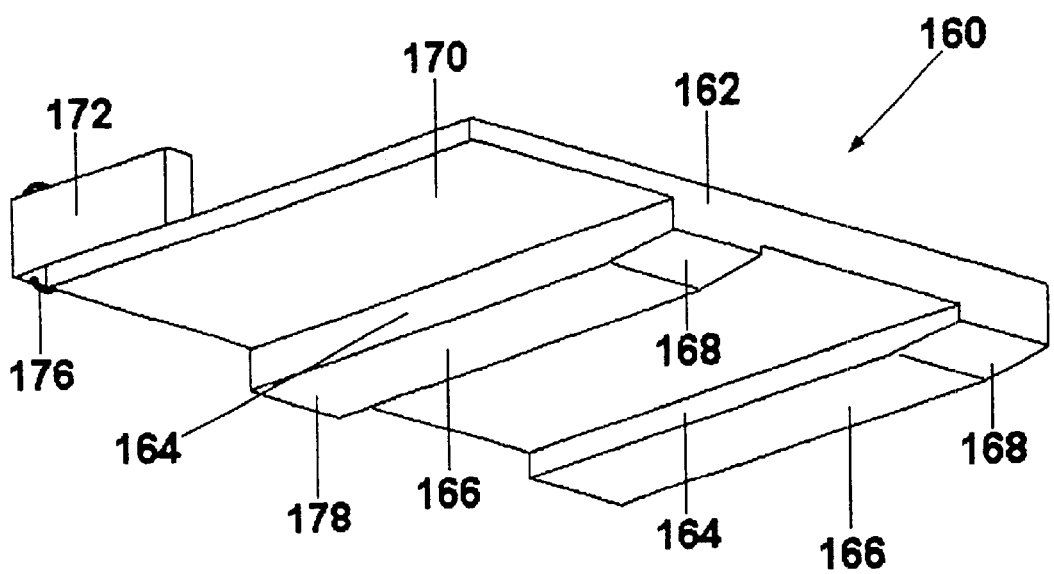
FIG. 3 is a bottom perspective view of a typical prior art glide test head having a positive-pressure air bearing slider.
Figure 4:
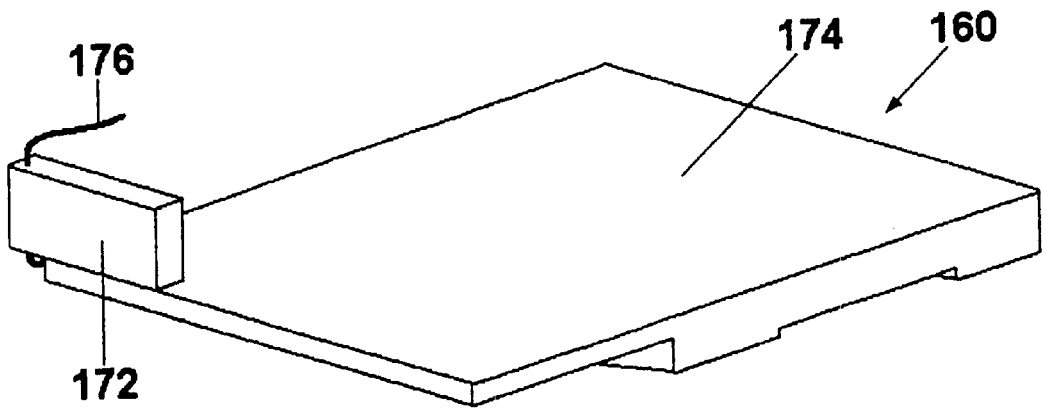
FIG. 4 is a top perspective view of the prior art glide test head of FIG. 3.

FIGS. 3 and 4 are, respectively, simplified bottom and top perspective views of a typical prior art glide test head 160. The glide test head consists of a slider body 162 which is typically formed from a stable ceramic material, such as aluminum oxide/titanium carbide. Features of the slider body 162 are commonly formed using the processes of machining, ion etching and precision lapping.

The glide test head 160 is of the type sometimes referred to as a "catamaran" or "positive-pressure" slider configuration, and includes a pair of laterally displaced rails 164 with air bearing surfaces 166 which interact with a thin layer of air dragged along by the spinning disc to fly the glide test head 160 at a desired fly height above the surface of the disc being tested. As is known to those of skill in the art, the flying height is determined, in part, by the geometry of the air bearing surfaces, and the flying attitude of the slider body is a function of the geometry of the air bearing surface, as well as the head suspension (140 in FIG. 2) used to support the glide test head 160.

At the leading edge of the air bearing surfaces 166 the rails 164 also typically include beveled regions 168 which are included to aid in the rapid establishment of the air bearing between the slider body 162 and the spinning disc.

FIGS. 3 and 4 show that the slider body 162 also includes a laterally extending wing 170 which is used to mount a contact sensor 172, such as a piezoelectric crystal or element. The reason that the slider body 162 includes the wing 170 for mounting the contact sensor 172 is that portion (shown at 174, generally, in FIG. 4) of the slider body 162 above the rails 164 is used to attach the head suspension (140 in FIG. 2) used to support the glide test head 160.

The contact sensor 172 include attached signal wires 176. During operation, such as in a test system similar to that of FIG. 2, contact between the air bearing surfaces 166 and a surface asperity on the disc under test will result in oscillation or ringing of the entire slider body 162. This excitation of the slider body 162 is conveyed to the contact sensor 172 which responds to this excitation by outputting electrical signals on the signal wires 176. These electrical signals are passed to appropriate detection logic (such as the defect mapping logic 156 of FIG. 2). If, as noted in the discussion of FIG. 2 above, the occurrence of the output of the contact sensor 172 is correlated to the position of the actuator and the rotational position of the disc under the glide test head, a defect map of the disc under test can be generated.

Figure 5:
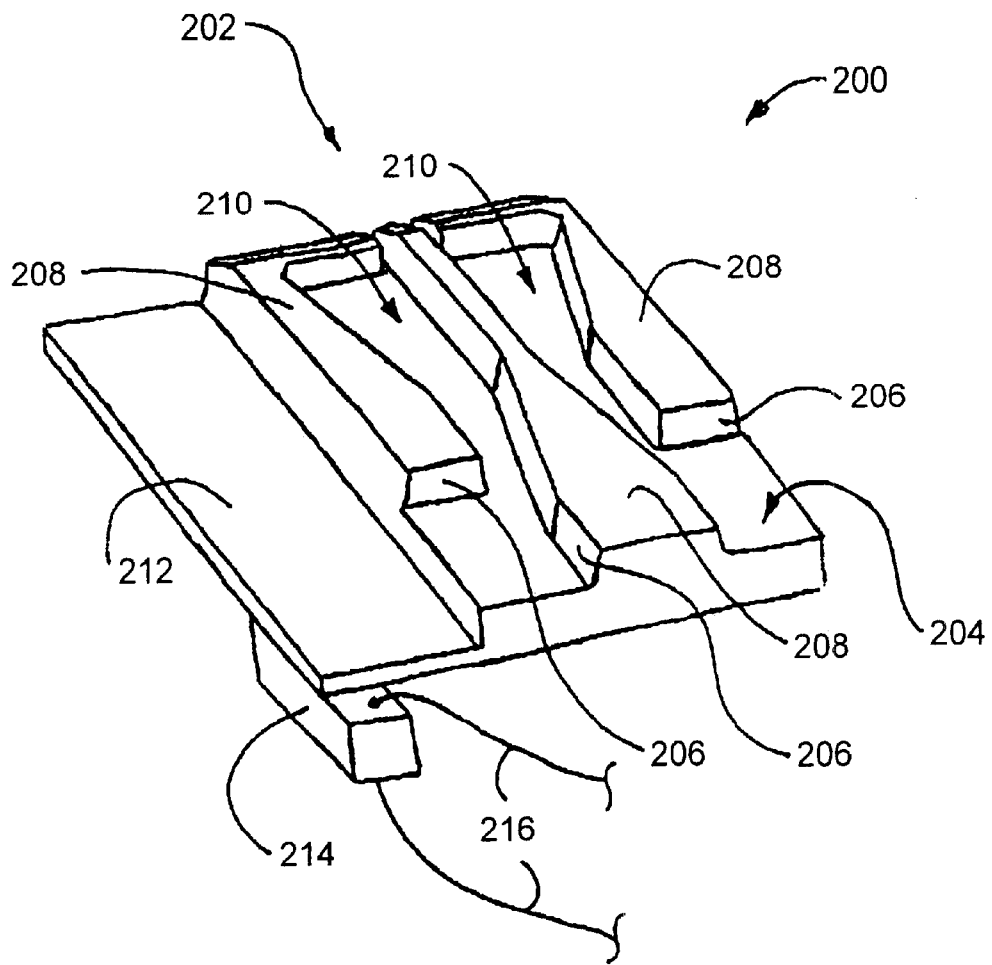
FIG. 5 is a bottom perspective view of a glide test head having a negative-pressure air bearing slider constructed and operated in accordance with preferred embodiments of the present invention.

FIG. 5 provides a bottom perspective view of a glide test head 200 having a negative-pressure air bearing slider configuration constructed and operated in accordance with preferred embodiments of the present invention. For clarity, a leading edge of the glide test head 200 is generally identified at 202.

The glide test head includes a slider body 204 from which a plurality of rails 206 extend, the rails 204 having corresponding bearing surfaces 208. During operation, air is diverted through channels (not designated) between adjacent rails 206, forming regions of low pressure 210 which maintain the glide test head 200 in a stable relationship with the corresponding disc 106.

In a manner similar to that discussed above for the glide test head 160 of FIGS. 3 and 4, the glide test head 200 of FIG. 5 further includes a laterally extending wing 212 which supports a contact sensor 214, having a piezoelectric or similar construction. As before, contact between the glide test head 200 and a feature of the disc under evaluation will result in the output of a signal via paths 216.

It will be noted that the operational characteristics of the negative-pressure glide test head 200 of FIG. 5 will typically be more stable and controlled than the operational characteristics of the positive-pressure glide test head 160 of FIGS. 3–4. For example, test results indicate that a three-sigma variation in fly height for a positive-pressure glide test head such as 160 can be as high as 113 A (0.45 μin), whereas the three-sigma variation in fly height for a negative-pressure glide test head such as 200 can be less than 40 A (0.16 μin).

Moreover, negative-pressure glide test heads have fly heights that are far less sensitive to rotational speed of the corresponding disc than positive-pressure glide test heads. The increased "stiffness" of the air bearing established by a negative-pressure glide test head provides increased signal resolution (i.e., higher signal-to-noise ratio) in the output of the contact sensor, improving defect detection efforts. Finally, since most read/write heads (such as 118, FIG. 1) of the current generation of disc drives typically employ negative-pressure slider configurations, the use of a negative pressure slider configuration in a glide test head provides better correlation between the glide test heads and production read/write heads.

However, the very advantages which make negative-pressure slider configurations desirable for use in production read/write heads also tend to be disadvantageous when attempting to incorporate such configurations in glide test systems. Unlike prior art positive-pressure slider configurations, the fly height of which can be readily controlled by simply speeding up or slowing down the linear velocity of the disc, negative-pressure slider configurations tend to fly in a much more stable manner at a nominal height above the disc and are accordingly less affected by disc rotational speed.

As discussed above, glide testing is typically performed at a fly height that is substantially lower (such as 50% lower) than the nominal operational fly height of production read/write heads in order to evaluate surface height defects (such as localized "peaks" on the discs). For example, a glide test system may test at a nominal fly height of 125 A (13 nm or 0.5 μin) over data portions of the disc for a corresponding nominal operational fly height for production read/write heads of 250 A (25 nm or 1.0 μin). At the same time, landing zone portions of the disc, also desirably evaluated during glide testing, may have texturized peaks with heights on the order of 165 A (17 nm or 0.66 μin). Thus, heretofore it has been difficult in the prior art to successfully incorporate negative-pressure slider configurations into glide test systems.

Figure 6:
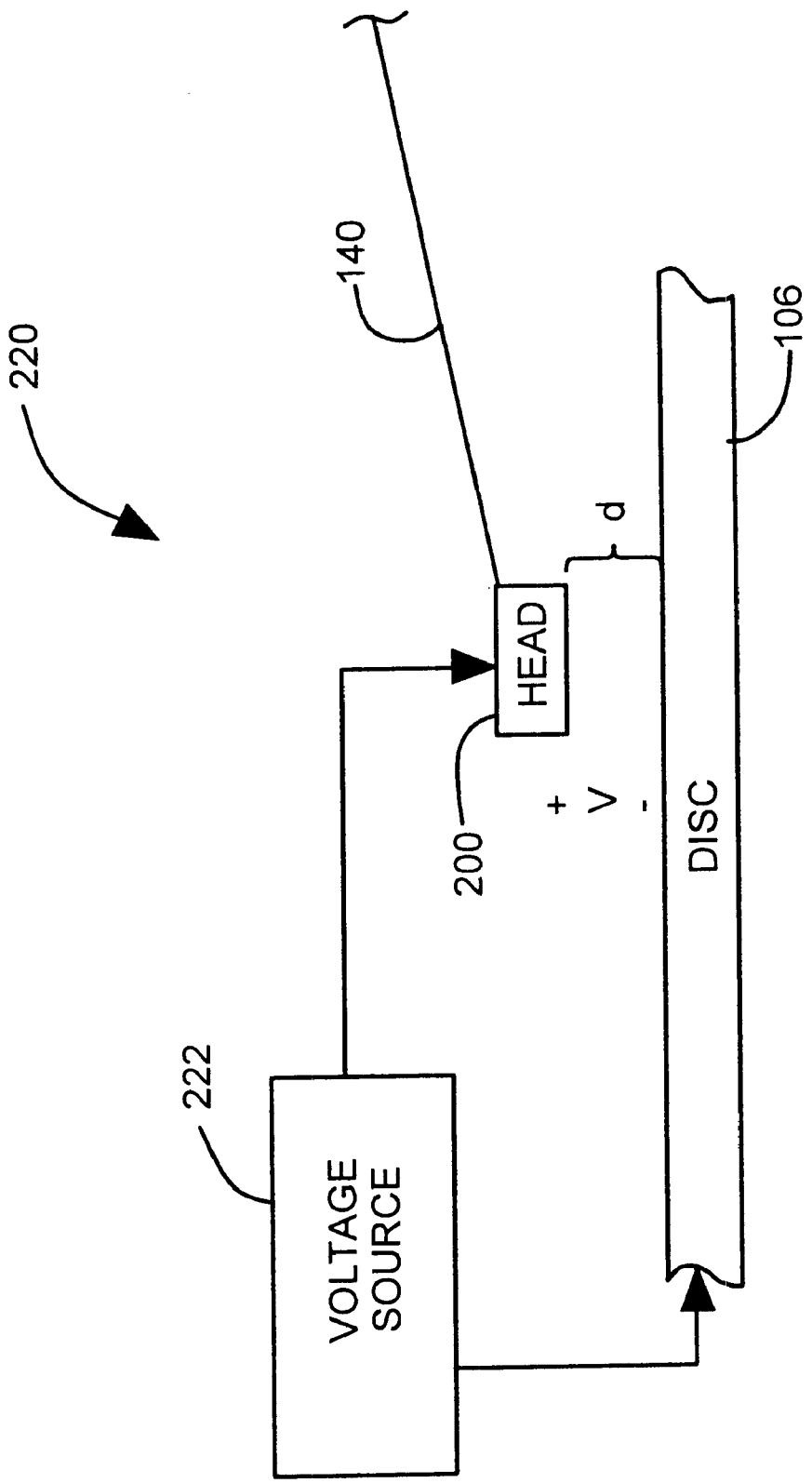
FIG. 6 is a schematic diagram of a portion of a glide test system including the glide test head of FIG. 5 in conjunction with an evaluation disc and a voltage source which controls the fly height of the glide test head with respect to the disc in accordance with preferred embodiments of the present invention.

FIG. 6 provides a schematic diagram of a portion of a glide test system 220 constructed and operated in accordance with preferred embodiments of the present invention. It will be understood that the glide test system 200 generally includes various portions of the prior art glide test system of FIG. 2, and so for purposes of clarity such have not been replicated in FIG. 6.

FIG. 6 shows the glide test head 200 of FIG. 5 in conjunction with an evaluation disc 106 and a voltage source 222 which controls the fly height of the glide test head 200 with respect to the disc 200 in relation to a magnitude of a fly height control voltage impressed across the glide test head 200 and the voltage source 222. Aspect ratios are exaggerated for clarity.

More particularly, as discussed more fully in co-pending U.S. patent application Ser. No. 09/258,091 filed Feb. 24, 1999 by Feng et al., assigned to the assignee of the present invention, the glide test head 200 and the disc 106 can be characterized as opposing plates of a variable capacitor, with at least the air layer supporting the glide test head 200 above the disc 106 comprising an intermediate dielectric layer. Although not shown in FIG. 6, it will be understood that disc 106 can further be supplied with various substrate layers, such as a layer of lubricant with a nominal thickness of 25 A (3 nm or 0.2 μin), and these substrate layers can further contribute to the dielectric layer. This capacitor can be modeled as follows:

$$C = Q/V = \epsilon \epsilon_r A/d \tag{1}$$

where C is the capacitance of the system, d is the head/disc gap, A is the surface area, and e and $e_r$ are the absolute and relative permittivity of the dielectric layer, respectively. The attractive force between the glide test head 200 and the disc 106 can be expressed as follows:

$$f = -\tfrac{1}{2} \epsilon \epsilon_r A V^2 / d^2. \tag{2}$$

It can be seen from equation (2) that the head/disc gap, d, can be readily changed by varying the applied voltage V. For example, an increase in voltage V leads to a higher attractive force f, resulting in a corresponding reduction in the gap d. Contrawise, a decrease in the voltage V leads to a lower attractive force f, increasing the gap d. It is further contemplated that the same polarity of charge might be applied to both the glide test head 200 and the disc 106 to establish a repelling force rather than an attractive force, as desired.

Accordingly, the glide test head 200 is configured to operate at a nominal fly height above the surface of the disc 106, with the voltage source 222 operating to deflect the fly height of the glide test head 200 from this nominal fly height in relation to a magnitude of the control voltage applied thereby. The glide test head 200 can be charged either positively or negatively with respect to the disc 106, and the voltage can either be a direct current (dc) voltage of selected magnitude or an alternating current (ac) voltage at selected frequency and magnitude. It will be understood that the control voltage is not applied to an active element of the head, as during normal data transducing operations (that is, the control voltage is not the same thing as a write current, for example); rather the control voltage is applied to charge the slider body 204 with respect to the disc 106 (irrespective of the actual polarities involved).

Figure 7:
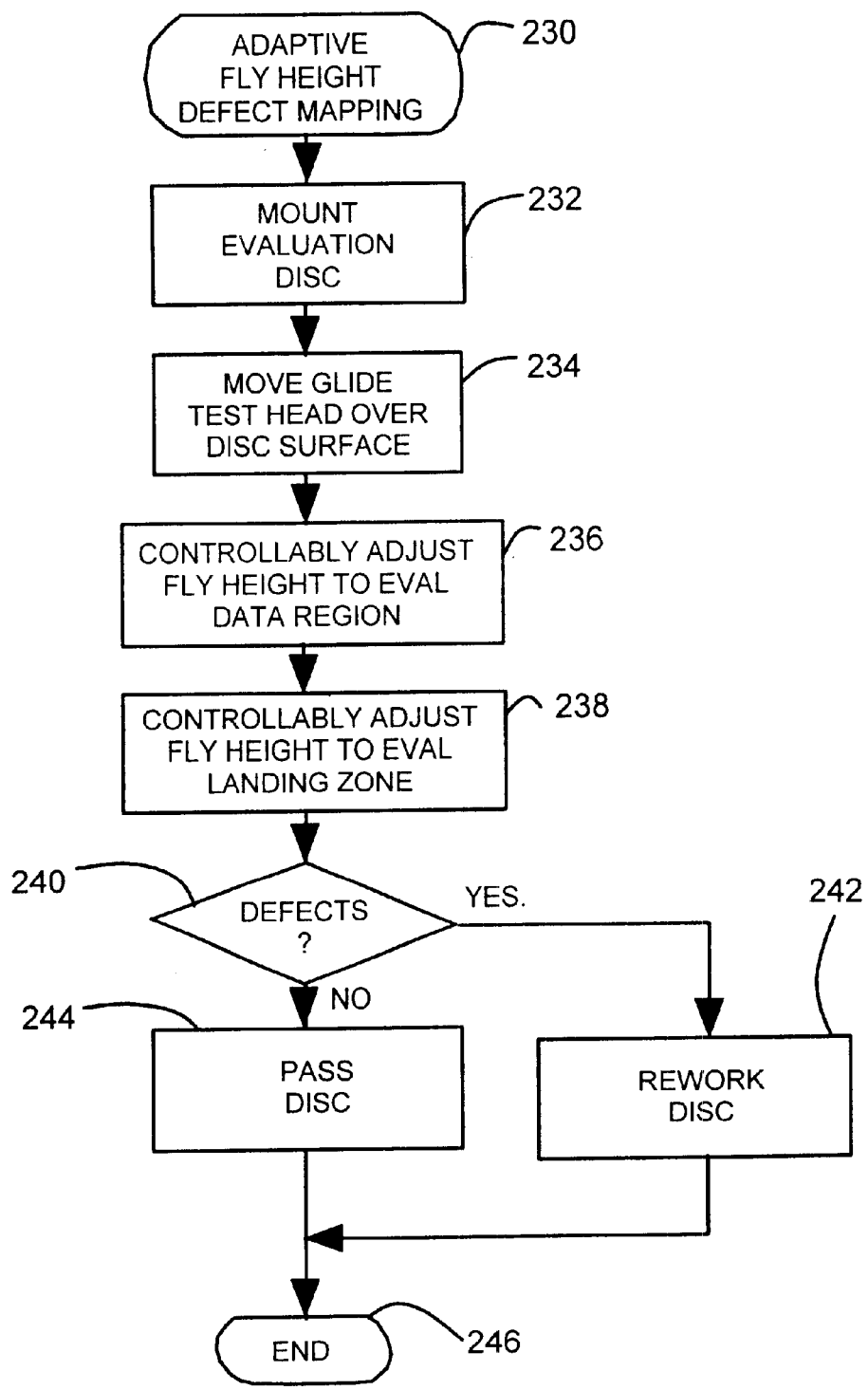
FIG. 7 is a flow chart for an ADAPTIVE FLY HEIGHT DEFECT MAPPING routine, generally illustrating steps performed by the glide test system of FIG. 6 in accordance with preferred embodiments of the present invention.

Referring now to FIG. 7, shown therein is a flow chart for an ADAPTIVE FLY HEIGHT DEFECT MAPPING routine 230, generally illustrating steps carried out by the glide test system 220 of FIG. 6 in accordance with preferred embodiments.

At step 232, the particular disc 106 to be evaluated is first mounted in the glide test system 220. After bringing the disc 106 up to a desired rotational speed, the glide test head 200 is next moved out over the disc surface, step 234. It will be noted that at such time that the glide test head 200 aerodynamically engages the air currents established by the rotation of the disc 106, the glide test head 200 will be supported over the disc 106 at a nominal flying height determined by the characteristics of the negative-pressure air bearing slider configuration thereof and, to a lesser extent, the rotational speed of the disc 106.

At step 236, the desired control voltage is applied across the glide test head 200 and the disc 106 to adjust the fly height of the glide test head 200 to a desired height to evaluate the data region of the disc 106. In one embodiment, empirical test data can be utilized to correlate desired fly height to applied control voltage for each glide test head; alternatively, closed loop measurement techniques can be utilized to adjust the applied control voltage to maintain the fly height at a desired level. During the operation of step 236, defects are detected and mapped as discussed above.

Continuing with the flow of FIG. 7, the glide test system 220 next preferably adjusts the control voltage to select a fly height for the glide test head 200 suitable for use in evaluating the texturized landing zone region of the disc 106. As discussed above, the surface features of the landing zone are typically substantially higher than those of the data region of the disc to eliminate stiction forces between the production read/write heads (such as 112 in FIG. 1) when such come to rest on the landing zones.

If an unacceptable level of defects is identified during the operation of the routine of FIG. 7, the flow passes from decision step 240 to step 242 wherein the disc is rejected and reworked as necessary. Alternatively, if the disc surface characteristics are deemed acceptable, the routine passes from decision step 240 to step 244 where the disc is approved for incorporation into a disc drive such as 100. The routine then ends at 246.

It will now be apparent that the present invention, as embodied herein and as claimed below, provides several important advantages over the prior art. The use of a glide test head with a negative-pressure air bearing slider configuration to provide a stable flight profile in combination with a voltage source to adaptively control the flying height of the glide test head facilitates evaluation of disc surface characteristics in an efficient and highly accurate manner, particularly for reduced glide test fly heights of 125 A (13 nm or 0.5 μin) or less. Moreover, greater detection sensitivity is afforded due to the improved stiffness of the glide test head air bearing, allowing more precise defect mapping and evaluation.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An apparatus for testing height characteristics of a recordable disc surface, comprising:
   a glide test head supportable over the disc surface comprising a negative-pressure air bearing slider to maintain the glide test head at a nominal distance over the disc surface in relation to a selected linear velocity of the disc and a contact sensor which outputs a signal when the glide test head contacts a feature of the disc surface; and
   fly height displacement means electrically charging the glide test head across a layer of air supporting the glide test head with respect to the disc surface so that the glide test head flies at a distance other than the nominal distance while the disc remains at the selected linear velocity.

2. The apparatus of claim 1, wherein the fly height displacement means comprises a voltage source, operably coupled to the glide test head and the disc, which applies a fly height control voltage to the glide test head with respect to the disc to displace the glide test head from the nominal distance in relation to a magnitude of the fly height control voltage.

3. The apparatus of claim 2, wherein the disc surface comprises a data region configured to magnetically store data as the disc is rotated and a texturized landing zone configured to support a disc drive read/write head when the disc is stopped, wherein the voltage source applies a first fly height control voltage to maintain the glide test head at a first flying height over the data region and wherein the voltage source applies a second fly height control voltage to maintain the glide test head at a second flying height over the landing zone.

4. The apparatus of claim 2, wherein the fly height control voltage comprises a direct current (dc) voltage.

5. The apparatus of claim 2, wherein the fly height control voltage comprises an alternating current (ac) voltage.

6. A glide test system for evaluating height characteristics of a surface of a recording disc prior to incorporation of the disc into a disc drive, the disc drive utilizing a read/write head to fly over the disc at a nominal operational fly height, the glide test system comprising:
   a glide test head supportable over the disc and comprising a negative-pressure air bearing slider and a contact sensor which outputs a signal when the glide test head contacts a feature of the disc surface, wherein the glide test head and the disc form opposing plates of a capacitor with a dielectric layer therebetween including at least a layer of air supporting the glide test head; and
   a voltage source, operably coupled to the glide test head and the disc, which applies a fly height control voltage across the layer of air supporting the glide test head to adjust the fly height of the glide test head to a glide distance less than the nominal operational fly height.

7. The glide test system of claim 6, wherein the nominal operational fly height is about 250 Angstroms (1.0 microinches) and the glide test fly height is about 125 Angstroms (0.5 microinches).

8. The glide test system of claim 6, wherein the nominal operational fly height is less than 250 Angstroms (1.0 microinches) and the glide test fly height is less than 125 Angstroms (0.5 microinches).

9. The glide test system of claim 6, wherein the disc surface comprises a data region configured to magnetically store data as the disc is rotated and a texturized landing zone configured to support the disc drive read/write head when the disc is stopped, wherein the voltage source applies a first fly height control voltage to maintain the glide test head at a first glide distance over the data region and wherein the voltage source applies a second fly height control voltage to maintain the glide test head at a second, greater glide distance over the landing zone.

10. The glide test system of claim 6, wherein the contact sensor comprises a piezoelectric construction.

11. A method for evaluating surface characteristics of a disc prior to incorporation of the disc into a disc drive configured to fly a read/write head over the disc at a nominal operational fly height, the method comprising the steps of
   (a) supporting a glide test head over a surface of the disc, the glide test head having a negative-pressure air bearing slider and a contact sensor which outputs a signal when the glide test head contacts a feature of the disc surface;
   (b) applying a fly height control voltage to a layer of air between the glide test head and the disc to adjust the fly height of the glide test head to a desired distance in relation to a magnitude of the fly height control voltage; and
   (c) identifying defects on the disc surface in relation to signals output by the contact sensor.

12. The method of claim 11, wherein the disc surface comprises a data region configured to magnetically store data as the disc is rotated and a texturized landing zone configured to support the disc drive read/write head when the disc is stopped, and wherein step (b) comprises steps of:
   (b1) applying a first fly height control voltage to maintain the glide test head at a first distance over the data region; and
   (b2) applying a second fly height control voltage to maintain the glide test head at a second distance over the landing zone, wherein the second distance is greater than the first distance.

* * * * *